United States Patent [19]

Teeters et al.

[11] Patent Number: 5,391,601
[45] Date of Patent: Feb. 21, 1995

[54] REPULPABLE LAMINATING ADHESIVE CONTAINING AN ELASTOMER, TACKIFIER AND A BLEND OF AN ALKOXYLATED ALCOHOL AND A WAX

[75] Inventors: Susan M. Teeters, Sand Springs, Okla.; Charles H. Heroux, Scarborough, Canada; Michael D. Watson, Tulsa; William P. Cottom, Mounds, both of Okla.; Terrance D. Duryee, Charlotte, N.C.

[73] Assignee: Petrolite Corporation, St. Louis, Mo.

[21] Appl. No.: 18,077

[22] Filed: Feb. 16, 1993

[51] Int. Cl.$^6$ .................. C08K 5/01; C08K 5/11; C08L 31/04; C08L 33/06
[52] U.S. Cl. .................. 524/270; 524/272; 524/274; 524/275; 524/277; 524/487; 524/489; 525/74
[58] Field of Search ........... 524/270, 272, 274, 275, 524/277, 487, 489; 525/74

[56] References Cited

U.S. PATENT DOCUMENTS

| | | | |
|---|---|---|---|
| 3,239,478 | 3/1966 | Harlan, Jr. | 260/27 |
| 3,390,035 | 6/1968 | Sands | 156/72 |
| 3,837,994 | 9/1974 | Flanagan et al. | 161/100 |
| 4,237,037 | 12/1980 | Takahashi | 525/74 |
| 4,299,930 | 11/1981 | Boggs | 525/74 |
| 4,405,747 | 9/1983 | Ehmann et al. | 524/503 |
| 5,055,526 | 10/1991 | Sato et al. | 525/74 |

OTHER PUBLICATIONS

Bareco Division of Petrolite Corporation, "Microcrystalline Waxes in Protective Packaging", Release No. 305.0, (Feb. 1, 1976).
Doshi et al., "Additives to Combat Sticky Contaminants in Secondary Fibers", 1989 Contaminant Problems and Strategies in Wastepaper Recycling, TAPPI Seminar Notes, pp. 81–89.
Tom Garbutt et al., "A Technical Respective of the Effect of Hot Melt Adhesives on the Recycling of Post Consumer Recovered Paper/Paperboard Materials", pp. 159–164.
Graves et al., "A Study of the Effects of Wax Structure on the Performance Properties of EVA Based Hot Melt Adhesives", reprint of paper presented at 1987 ASC Raw Materials Seminar in Cincinnati, Ohio.
Lennert, "What's Up at P&G in Composting and Recycling", pp. 127–133.
McKinney, "A Review of Stickie Control Methods, Including the Role of Surface Phenomena in Control", 1989 Contaminant Problems and Strategies in Wastepaper Recycling, TAPPI Seminar Notes, pp. 101–107.
Unmuth et al., "Hot Melt Laminants, Background and intercomparison", a paper presented at the Technical Session of the Hot Melt Committee held at the 1972 Paper Synthetics Conference of TAPPI.

*Primary Examiner*—Paul R. Michl
*Assistant Examiner*—Olga Asinovsky
*Attorney, Agent, or Firm*—Pravel, Hewitt, Kimball & Krieger

[57] ABSTRACT

The present invention relates to a blend of a linear or branched chain saturated aliphatic hydrocarbon wax having a molecular weight of between about 300 to about 5,000 and an alkoxylated alcohol of the formula A—B, wherein A is the unit: $CH_3(CHR-CHR_1)_x$— and B is the unit: $-CH_2O(CH_2CHR_2O)_yH$. R and $R^1$ are independently selected from the group consisting of hydrogen and a $C_1$–$C_{10}$ alkyl group; $R_2$ is hydrogen or a $C_1$–$C_5$ alkyl group; x is between about 1 to about 142; and y is between about 2 to about 817, provided the weight ratio of B/A+B is between 51 and 90 percent. Such blends may be used with an elastomer and tackifier to form a repulpable laminating adhesive. The invention further relates to a laminating adhesive containing alkoxylated alcohol, elastomer, wax and tackifier.

30 Claims, No Drawings

REPULPABLE LAMINATING ADHESIVE CONTAINING AN ELASTOMER, TACKIFIER AND A BLEND OF AN ALKOXYLATED ALCOHOL AND A WAX

BACKGROUND OF THE INVENTION

Wax-based, hot-melt laminates have long been used in the packaging industry. They offer excellent protective barrier properties and thus serve to protect the contents of packages against the loss or gain of moisture vapor or gases.

In addition to performing as a protective barrier film, such laminates also act as adhesives. The adhesive characteristics permit the joining of dissimilar films, foils or papers. In addition, hot melt laminates are important adhesives for bonding difficult to wet substrates or for bonding substrates which are rigid and load bearing.

The prior art hot melt laminates largely consisted of three ingredients—an elastomer (such as a conventional ethylene vinyl acetate copolymer containing about 28 weight percent vinyl acetate units), a tackifier and a wax. The strength of the laminate is measured by its ability to bond two surfaces together. This is controlled not only by the adhesion to the surfaces involved, but also to the cohesive strength of the laminate itself and by the cohesive characteristics of the substrate. The adhesive strength factor depends upon the chemical-mechanical bond that is created between the laminate and the surface of the substrate.

Laminate adhesives are used in several industries, including the food industry. As landfills continue to close and concerns about the environment are increased, interest in development of recyclable laminate adhesives is being renewed.

The recycling of wastepaper from materials containing laminate adhesives proceeds generally by one of three methods. In two of the methods, the adhesive is separated from a water slurry of recycled fibers using either cleaners or screens. When screens are employed, the pulp slurry is passed through a cylindrical screen plate fitted with small holes or fine vertical slots. Particles of the adhesive are separated out and rejected. When cleaners are used, the pulp slurry is pumped into the cleaner to form a spiraling flow. The slurry is thereby subjected to a centrifugal field. A central core is formed in which the particles of adhesives concentrate. A portion of the pulp slurry is extracted from this central core carrying the rejected adhesive particles.

In the third method, a thickened pulp slurry is heated to a temperature, generally ranging from 180° F. to 250° F. It is then subjected to an intensive shearing and/or kneading action. The adhesive particles are broken down to fine sizes, thereby minimizing spotting. Considerable energy is expended, however, in the process.

In the design of modern recycling systems, interest has been centered on those properties of laminates which are useful in the separation of the adhesive particulates from the pulp slurry. Much attention has been paid to the size of the adhesive particulate and its resistance to breakup when the wastepaper is wetted and broken up in a pulper. Pulpers have been specifically designed to minimize breakup of the laminate particulate during the pumping action. The larger particulates are separated from the pulp slurry with screens. To separate the particulates that pass through the screens, the pulp slurry is pumped into a through-flow cleaner wherein the smaller adhesive particulates are removed. If screening and cleaning are insufficient to produce the required cleanliness, the pulp is subjected to dispersion.

Laminate adhesives must be repulpable in order to maximize wastepaper quality. Such laminates typically contain an elastomeric resin and a tackifying resin. In addition, they may contain antioxidants, fillers and plasticizers. The elastomeric resin serves to form the backbone and contributes to the cohesive strength and toughness of the composition. Tackifying resins promote specific adhesion and help the adhesive to wet the substrate. In addition, a wax is added to decrease melt viscosity, increase the crystallinity and control the open and set times of the elastomeric resin.

Microcrystalline waxes, as well as paraffin waxes, are principally used in commercially available laminates. In addition to such waxes, commercially available laminating adhesives further contain a tackifier and a resin. The resin is principally either a conventional ethylene vinyl acetate copolymer (having between 25 and 28 weight percent of vinyl acetate units) or a synthetic rubber. Previous efforts to recycle materials containing laminate adhesives has been largely unsuccessful due to the non-dispersability of waxes and resins contained in such adhesives.

It is most desired to develop a laminating adhesive which is compatible with aqueous systems and is recyclable. Compatibility defines the ability of the composition to impart adhesive properties to contiguous layers. Compatibility may be measured by various means such as viscosity stability, melt flow characteristics and cloud point. In particular, compatibility references the physical state wherein the elastomeric resin, tackifier and other additives are in a homogenous indistinct blend. In an incompatible adhesive, the elastomer, tackifier and other additives are in discrete areas in the molten state.

SUMMARY OF THE INVENTION

The present invention is drawn to a blend comprising a 5:95 to 100:0 ratio by weight of (i) an alkoxylated alcohol of the formula $$A-B \qquad (I)$$

wherein A is the unit

$$\underset{CH_3(CHCH)_{\overline{x}}}{\overset{R \quad R_1}{| \quad |}} \qquad (IA)$$

and B is the unit

$$\underset{CH_2O(CH_2CHO)_yH}{\overset{R_2}{|}} \qquad (IB)$$

and further wherein R and $R_1$ are independently selected from the group consisting of hydrogen and a $C_1$–$C_{10}$ alkyl group; $R_2$ is hydrogen or a $C_1$–$C_5$ alkyl group; x is between about 1 to about 142; and y is between 2 to about 817; and (ii) a linear or branched chain saturated aliphatic hydrocarbon wax having a molecular weight of from about 300 to about 5,000. The weight ratio of B/A+B in formula (I) is between about 51 and about 90 percent. The blend, when combined with an elastomeric resin and a tackifying agent, renders a repulpable laminating adhesive. The invention is further drawn to laminating adhesives containing the blend, elastomer and tackifying resin.

The presence of the high molecular weight alkoxylated alcohol (I) in the blend increases the dispersability of the elastomeric resin and tackifier thereby making the resulting laminating adhesive repulpable. The resulting laminating adhesive compositions are dispersible in water and are, at the same time, repulpable. The elastomers and tackifying resins which may be employed are those known in the art.

DESCRIPTION OF THE PREFERRED EMBODIMENTS

The invention relates to a blend used in the production of laminating adhesives and laminating adhesives containing such blends. The laminating adhesives are repulpable in commercial milling operations.

The blend contains an alkoxylated alcohol and wax particles. The alkoxylated alcohol disperses the other components in the laminate.

Exemplary of the alkoxylated compounds used in formulating the laminates of this invention are those represented by the formula:

$$A\text{-}B \qquad (I)$$

wherein A is the unit

 (IA)

and R and $R_1$ individually represent hydrogen or the same or different lower alkyl groups of from 1 to about 10 carbon atoms; and x represents a number of from about 1 to about 142 and preferably from about 11 to about 70; and B is the unit

 (IB)

wherein $R_2$ represents hydrogen or a $C_1$-$C_5$ alkyl group; y represents the average number of oxyalkylene groups present in the molecule and is a number of from 2 to about 817, and preferably about 3 to about 408, most preferably from about 3 to about 204. In addition, the weight percent of B/A+B in formula (I) is between about 51 to about 90, more preferably 75 to about 85, most preferably 80. The average molecular weight of Unit A (I) may range from about 250 to about 4,000, preferably no greater than 1,000.

Unit A of formula (IA) above normally has a molecular weight between about 350 to about 2,000, preferably 425 to about 1,000. In addition, the purity of Unit A is preferably greater than 70%.

Preferred alkoxylated alcohols for use in formulating the blends of this invention are those represented by formula (I) above wherein R, $R_1$ and $R_2$ are independently selected from the group consisting of hydrogen and $C_1$-$C_3$ alkyl. Most preferred are those compounds wherein R, $R_1$, and $R_2$ are independently hydrogen or a methyl group, especially those represented by the formulae:

$$CH_3(CH_2CH_2)_xCH_2O(CH_2CH_2O)_yH \qquad (IIA)$$

and

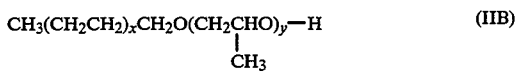

as well as mixtures thereof. As an alternative the compound may be of formula (I) above where $R_2$ is randomly selected from the substituents —H and —$CH_3$. The average molecular weight of the alkoxylated alcohols of Formula (IIA) and (IIB) are most preferably about 700 to about 5,000.

Especially preferred alkoxylated alcohols include UNITHOX® 480 ethoxylate and UNITHOX® 580 ethoxylate. UNITHOX® 480 is an ethoxylated alcohol which consists of twenty weight percent of unit A of the formula IA (wherein R and $R_1$ are hydrogen) and having a molecular weight of about 425 and eighty weight percent of unit B of the formula IB (wherein $R_2$ is hydrogen). UNITHOX® 580 is an ethoxylated alcohol which consists of 20 weight percent of units of the formula IA (wherein R and $R_1$ are hydrogen) of molecular weight 550 and 80 weight percent of ethoxylate units of formula IB (wherein $R_2$ is hydrogen). Both UNITHOX® 480 and UNITHOX® 580 are products of Petrolite Polymers Division in Tulsa, Okla.

A portion of the alkoxylated alcohol used in this invention could be substituted, with an oxygen-containing polymer. The oxygen-containing polymer may be a high molecular weight alcohol, a high molecular weight carboxylic acid or a cyclic anhydride graft polyolefin.

The molecular weight of the alkyl (C,H) portion of the oxygen-containing polymer is less than 2,000 preferably less than 1,500, most preferably less than 1,000.

The high molecular weight carboxylic acid is preferably a monocarboxylic acid of the formula RCOOH wherein R is a straight or linear saturated hydrocarbon chain of molecular weight less than 2,000. When the oxygen-containing polymer is a monocarboxylic acid, the molecular weight of R is most preferably between 300 and 800.

The high molecular weight oxygen-containing polymer can further be a hydrocarbon having multiple functional groups, such as carboxylic acid, carboxylic acid anhydrides, ketones, alcohols, esters, etc., distributed along their chains or are the result of a graft polymerization process. Particularly preferred are linear polyolefins, such as the polyethylenes, upon which has been grafted cyclic anhydrides such as maleic, fumaric and itaconic anhydride. Maleic acid anhydride is particularly preferred. The acid groups are grafted onto a polyolefin backbone which typically is polyethylene, polypropylene, and copolymers of ethylene and propylene. As set forth above, the molecular weight of the backbone is less than 2,000. The functional groups of the graft copolymers may be generally quantified by determination of an acid number which is the amount of potassium hydroxide in milligrams required to neutralize one gram of the polymer. Such graft copolymers further generally have an acid number in the range of about 5 to about 200.

Still preferred as the oxygen-containing polymer are those polymeric alcohols of the formula $$C\text{—}D \qquad (III)$$

wherein C is represented by a unit of the formula:

 (IIIA)

$$CH_3(CHCH)_r\text{—}$$

and D is represented by a unit of the formula:

 (IIIB)

$$CH_2O(CH_2CHO)_sH$$

and further where R and $R_1$ are independently selected from the group consisting of hydrogen and a $C_1$–$C_{10}$ alkyl group, $R_2$ is hydrogen or a $C_1$–$C_5$ alkyl group; r is greater than or equal to 1 but less than 70; preferably from about 9 to about 60, most preferably from about 11 to about 45; and s is between about 0 to about 45, preferably 3 to 40, most preferably 14 to 25; provided the weight ratio of D/C+D is between 0 and 50 percent and the molecular weight of the C unit is less than 2,000, preferably less than 1500, most preferably less than 1,000. The weight ratio of D/C+D is preferably between 0 and 20 percent.

Exemplary of suitable alcohols for use in this instance (wherein s is zero) are those of the formula

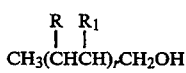 (IV)

$$CH_3(CHCH)_rCH_2OH$$

wherein R and $R_1$ individually represent hydrogen or the same or different lower alkyl groups of from 1 to about 10 carbon atoms; and r is greater than or equal to 1 but less than 70, and preferably from about 9 to about 60. Such alcohols are commercially available under the trade name UNILIN ® alcohols from Petrolite Polymers Division of Petrolite Corporation, Tulsa, Okla. Examples of such long chain primary alcohols are UNILIN ®-425, UNILIN ®-550 and UNILIN ®350 which have a molecular weight of about 425, 550, and 350, respectively.

Alcohols of formula (IV) typically average 24 to 45 carbon atoms (on a weight basis), preferably 28 to 42 carbon atoms, most preferably about 30 to 40 carbon atoms. Such alcohols are derived by hydroxylating long chain hydrocarbons.

When s of formula IIIB is greater than or equal to 1, the C unit of the alcohol preferably has a molecular weight between about 200 to about 2,000 most preferably between 350 to about 1,000. Especially preferred alcohols (wherein s is greater than or equal to 1) include UNITHOX ® 420 ethoxylate and UNITHOX ® 520 ethoxylate. UNITHOX ® 420 and UNITHOX ® 520 are ethoxylated alcohols which consist of 80 weight percent of units of the formula IIIA:

$$CH_3(CHCH)_r$$

and 20 weight percent of ethoxylate units of the formula IIIB:

$$CH_2O(CHCHO)_s$$

wherein R, $R_1$ and $R_2$ are all hydrogen. The average molecular weight of UNITHOX ® 420 and UNITHOX ® 520 are 530 and 690, respectively. Such products are commercially available from Petrolite Polymers Division in Tulsa, Okla.

Especially preferred high molecular weight alcohols for use in formulating the blends for use in laminating adhesives are those represented by formula (III) above wherein R and $R_1$ are independently selected from the group consisting of —H and $C_1$–$C_{10}$ alkyl and $R_2$ is —H or a $C_1$–$C_5$ alkyl group. Most preferred are those compounds represented by the formula:

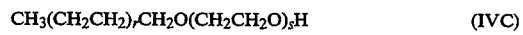

$$CH_3(CH_2CH_2)_rCH_2O(CH_2CH_2O)_sH \qquad (IVC)$$

and

$$CH_3(CH_2CH_2)_rCH_2O(CH_2CHO)_s\text{—}H \qquad (IVD)$$
$$\underset{CH_3}{|}$$

as well as mixtures thereof. As an alternative the compound may be of formula (III) above where $R_2$ is randomly selected from the substituents —H and —$CH_3$.

The oxygen-containing polymer when substituted for a portion of the alkoxylated alcohol of formula (I) serves to enhance compatibility and further to improve the moisture vapor transmission rate. In order to maintain repulpability of the composition, the weight ratio of oxygen-containing polymer to alkoxylated alcohol (I) should not exceed 1:1.

The wax component in the blend of this invention can be polyolefin waxes such as polyethylene wax. The polyolefin used in preparation of the compositions of this invention may be described as having a molecular weight of about 300 to about 5,000. The polyolefin may be linear or may have a number of branch formations in its molecular structure. When branched, the polyethylenes preferably have one or two branches per molecule on the average and the branches may have 1 to 6 carbon atoms, preferably $C_1$–$C_6$ alkyl group.

In addition, to such synthetic waxes as polyolefin waxes, the wax of the present invention may comprise petroleum-derived waxes like paraffin and microcrystalline waxes.

The paraffin waxes are mostly linear alkanes having about 20–36 carbon atoms per molecule on the average and a molecular weight of about 280–500 and may include $C_{18}$–$C_{36}$ isoalkanes and cycloalkanes.

Microcrystalline waxes are preferred since generally they do not form brittle bonds. The microcrystalline waxes generally have molecular weights of about 500–700 with somewhat more branching than the paraffin waxes. The microcrystalline waxes may be hard waxes (having a melt point greater than 185° F. and a penetration number, by ASTM 1321, lower than 17) or soft waxes (having a melt point lower then 185° F. and a penetration number greater than 17).

Furthermore, the wax of the present invention may include Fischer-Tropsch waxes. Such waxes are polymethylenes. Polymethylene wax production is based on the Fischer-Tropsch synthesis, which is basically the polymerization of carbon monoxide under high pressure to produce the wax. The polymethylene waxes useful herein preferably may have an average molecular weight of 600–1,000.

Other closely related materials that can be used include the natural waxes, such as beeswax, carnauba and candelila waxes. In addition, the composition of this invention may contain a mixture of any of the waxes set forth above.

Also contemplated in the present invention is a wax which has been chemically modified. These include the partially oxidized polyethylenes, polymethylenes and the petroleum-derived waxes. The oxidized low molecular weight mostly linear hydrocarbons of a molecular weight of 300–3,000 have multiple functional groups, such as carboxylic acid, ketones, alcohols, esters, etc., distributed along their chains or are the result of a graft polymerization process. Particularly preferred are linear polyethylenes upon which has been grafted cyclic anhydrides such as maleic, fumaric and itaconic acid anhydride. The functional groups of the oxidized hydrocarbons may be generally quantified by determination of an acid number which is the amount of potassium hydroxide in milligrams required to neutralize one gram of the oxidized polymer. The oxidized hydrocarbons will normally have an acid number in the range of from about 5 to about 200.

The blend comprises 5:95 to 100:0, preferably 5:95 to 95:5, percent by weight of alkoxylated alcohol to hydrocarbon wax. Particularly preferred are those blends having a weight ratio of 20:80 to 30:70.

The invention is further drawn to a laminating adhesive containing (i) a blend of alkoxylated alcohol and hydrocarbon wax; (ii) elastomer; and (iii) tackifier. The alkoxylated alcohol and hydrocarbon wax are selected from those species set forth in the above paragraphs. The alkoxylated alcohol and hydrocarbon are present in a weight ratio of 5:95 to 100:0, most preferably 20:80 to 30:70.

When at least partially cured, the compositions may be used in laminates as the intermediate layer functioning to hold together the contiguous layers of the laminate. When used in such laminates, the laminates have been shown to be repulpable.

Approximately 75 to about 95 percent by weight of the laminate adhesive of this invention is the blend of wax and alkoxylated alcohol. Preferably the blend of wax and alkoxylated alcohol of this invention contains 80 to 90, most preferably 83 to 85, parts by weight of the adhesive system.

Antioxidants, fillers and plasticizers may further be incorporated in the adhesive system of this invention.

The elastomeric resins used in the laminating adhesives of this invention may be selected from conventional ethylene vinyl acetate copolymers having approximately 25 to 28 weight percent vinyl acetate units, ethylene acrylic acid copolymers, natural or synthetic rubbers including styrene-isoprene and styrene-butadiene random and block copolymers, polyvinyl acetate and vinyl acetate/unsaturated carboxylic acid copolymers, polyethylene, polypropylene, polyvinyl acetals, polyamides, polyesters, polyurethanes and ethyl cellulose.

Of these, ethylene/vinyl acetate copolymers are most preferred and are used primarily because of their excellent heat stability and high resistance to aging, chemical attack and water.

The block copolymers which may be used as the resin in this invention are of the A—B—A type wherein A is a thermoplastic polymer block and B is the elastomeric polymer block of a conjugated diene. The average molecular weight of the A and B blocks are 5,000 to 125,000 and 15,000 to 250,000, respectively. The block copolymers may be partially or completely hydrogenated. The end blocks may comprise homopolymers or copolymers of vinyl monomers such as vinyl arenes, vinyl pyridines, vinyl halides and vinyl carboxylates, as well as acrylic monomers such as acrylonitrile, methacrylonitrile esters of acrylic acids etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene. Other non-elastomeric terminal polymer blocks may be derived from alpha olefins, alkylene oxides, acetals, urethanes, etc. The center elastomeric blocks are prepared from conjugated dienes such as isoprene, butadiene, copolymers of styrene and butadiene as well as their homologues.

About 2 to about 15, most preferably 10 to about 12 parts by weight of the laminating adhesive composition of this invention is the elastomeric resin.

The tackifying resin serves to extend the adhesive properties of the elastomeric polymer. Such tackifying resins include (1) natural and modified rosins, such as gum rosin, wood rosin, tall oil rosin, distilled rosin, hydrogenated rosin, dimerized rosin and polymerized rosin; (2) glycerol and pentaerythritol esters of natural and modified rosin such as, for example, the glycerol ester of pale, wood rosin, the glycerol ester of hydrogenated rosin, the glycerol ester of polymerized rosin, the pentaerythritol ester of hydrogenated rosin and the phenolic-modified pentaerythritol ester of rosin; (3) polyterpene resins especially those resulting from the polymerization of terpene hydrocarbons, such as the bicyclic mono-terpene known as pinene, in the presence of Friedel-Crafts catalysts; (4) chlorinated terphenyl resins containing from about 42 to 60%, by weight, of chlorine; (5) phenolic-modified terpene resins such as, for example, the resin product resulting from the condensation in an acidic medium of a bicyclic terpene and a phenol; and (6) aliphatic petroleum hydrocarbon resins principally those resulting from the polymerization of monomers consisting primarily of olefins and diolefins. Excellent results have been obtained with polymerized rosin pale, wood rosin, the glycerol ester of hydrogenated rosin, the glycerol ester of polymerized rosin, the pentaerythritol ester of hydrogenated rosin, and phenolic-modified pentaerythritol ester of rosin which has been hydrogenated. Terpene and coumaroneindene resins are also employed. Polyterpene-resins (obtained by distillation of conifers), phenolic resins, and petroleum hydrocarbon resins, maleic anhydride-modified rosin and rosin derivatives, partial esters of styrene-maleic acid copolymers, chlorinated biphenyls and oil-soluble phenol-aldehyde resins can also be used.

Effective proportion of tackifier for use in the laminating adhesives of the present invention is about 1 to about 10 weight parts of the adhesive composition.

A stabilizer can further be added to the laminating adhesive system of the invention. Such stabilizers serve to enhance the pot-life of the molten adhesive. Typically useful stabilizers or antioxidants for the adhesive composition are the 2,4,6-trialkylated monohydroxy phenols, e.g., 2,4,6-tri-tertiarybutyl phenol and 2,6-di-tertiary-butyl-4-methyl phenol, 4,4'-thio-bis (6-tertiary butyl m-cresol); butylated hydroxy anisole and butylated hydroxy toluene. Effective proportions of stabilizer ordinarily are in the range of from about 25 parts per million to about 0.5 part per 100 parts by weight of the adhesive composition, preferably about 0.1 to 0.4 part per 100.

The blends containing the alkoxylated alcohols of this invention usually have a softening point within the range of 60°–120° C. and have added to them a blend of elastomer and tackifier (and stabilizer when present) at a temperature between 140° C. and 180° C.

Alcohols of the present invention of formulae (I) and (III) are prepared by reacting the corresponding primary linear polymeric alcohol with an oxyalkylating agent. The primary linear polymeric alcohols may be reacted with such oxyalkylating agents such as ethylene oxide, propylene oxide and mixtures thereof. The starting materials can be readily alkoxylated with the just described alkylene oxides using typical base catalysts, such as potassium hydroxide, sodium hydroxide, sodium ethoxide, potassium t-butoxide, sodium hydride or sodium or potassium metals. The reaction is normally conducted under pressures of 0 to 60 psig and at temperatures of 212° to 356° F. (100° to 180° C.). Higher temperatures are normally avoided to minimize side reactions and color formation.

By varying the molecular weight of the starting alcohol and the amount of alkoxylation, a variety of compounds of varying molecular weights can be prepared. Thus, the molecular weight of the starting alcohol may be known to have an average molecular weight of from about 250 to about 4,000.

The compositions of this invention are extremely useful as repulpable adhesives for those cellulose containing products consisting of light to heavy paper products including tissue, newsprint, Kraft paper, cardboard stock and the like. The paper can be light weight, such as facial tissue, to heavy fiber stock such as corrugated cardboard manufacture. The paper face stock may be formed of any pulpable cellulosic fiber material, virgin and recycled.

The laminating adhesives of this invention may be produced by a variety of methods. For instance, the elastomer and tackifier could be first melted. To the molten mass, the blend comprising oxyalkylated alcohol and wax are added.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

In the following examples, all percentages are on a weight/weight basis unless otherwise indicated. Shear adhesion failure temperature (SAFT) and peel adhesion failure temperature (PAFT) tests were conducted in accordance with the following protocol. Strips of 75 pound Kraft paper were coated with approximately 5 mils of adhesive using a drawndown bar. The strips were cut to 2×3 inches and sealed to uncoated Kraft paper using a Sentinel Sealer at 300° F., 10 psi and 1 second dwell time. The sealed samples were cut to 1×2.5 inches resulting in a bonded area of 1 square inch. The test strips were suspended in a programmable oven and hung in a T-peel with a 50 g weight or a lap shear with a 250 g weight. The temperature of the oven was raised at 0.25° C. per minute and the temperature of bond failure was recorded. A triplicate of each sample was run. The average standard deviation was 3.6° F.

EXAMPLE I

A heavy duty mixer equipped with a stirring paddle was used with a suitable container which had been heated to 320° F. and charged with 63 parts of a microcrystalline wax blend as set forth in Table I.

TABLE I

| Amount Microcrystalline Wax | ASTM D 127 melt pt. °F. | ASTM D1321 Penetration at 77° F., mm |
|---|---|---|
| 40 parts | 169–171 | 28–30 |
| 16 parts | 176–178 | 16–18 |
| 7 parts | 196–198 | 5½–6 |

The wax was completely melted. Stirring was then initiated whereupon 12 parts of an ethylene-vinyl acetate copolymer was added slowly in order to prevent the formation of lumps. Heating and stirring were continued until a homogeneous mass was obtained whereupon five parts of polyterpene resin (commercially available under the trade name of WINGTACK) was added slowly in order to prevent the formation of lumps. Heating and stirring were continued until a homogeneous mass was obtained whereupon 20 parts of UNITHOX ® 480 was added to reduce the melt viscosity of the system.

A molten sample of laminating adhesive as prepared above was applied between two sheets of paper. After cooling, two grams of paper with adhesive were cut into approximately one-half to one inch squares. (In a ½ inch square there was approximately 0.1 g of adhesive.) Two hundred grams of alkaline water (pH of 10) was added to a waring blender at a 120° F. Two grams of the cut paper with adhesive were then added to the blender and mixed for 15 minutes at a medium speed. The liquid was then poured through a 60 mesh screen. The filtrate was then vacuumed dried, pressed and then air dried. Further improvements could be made using known separation techniques such as deinking, screens, filters and cleaners.

EXAMPLE II

This example illustrates the preparation of the blend of microcrystalline wax and alkoxylated alcohol.

A heavy duty mixer equipped with a stirring paddle was used with a suitable container which was heated to 320° F. and charged with 63 parts of microcrystalline wax blend. Heating and stirring were continued until a homogenous mass was obtained whereupon 20 parts of UNITHOX ® 480 was added to reduce the melt viscosity of the system. The wax and UNITHOX were stirred and heated for approximately 1 hour at 300° F. The blend was then cooled.

What is claimed is:
1. A repulpable laminating adhesive comprising
   (a) an elastomer;
   (b) a tackifier; and
   (c) a 5:95 to 95:5 weight percent blend of
      (i) an alkoxylated alcohol of the formula

A—B　　(I)

wherein A is the unit

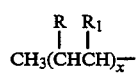　　(IA)

and B is the unit $$\begin{array}{c} R_2 \\ | \\ CH_2O(CH_2CHO)_yH \end{array} \quad (IB)$$

and further wherein R and $R_1$ are independently selected from the group consisting of hydrogen and a $C_1$-$C_{10}$ alkyl group; $R_2$ is hydrogen or a $C_1$-$C_5$ alkyl group; x is between about 1 to about 142; and y is between about 2 to about 817, provided the weight ratio of B/A+B is between 51 and 90 percent; and (ii) a linear or branched chain saturated aliphatic hydrocarbon wax.

2. The laminating adhesive of claim 1 wherein x is between about 11 to about 70.

3. The laminating adhesive of claim 1 wherein y is between about 3 to about 408.

4. The laminating adhesive of claim 3 wherein y is between about 3 to about 204.

5. The laminating adhesive of claim 1 wherein the weight ratio of B/A+B is between about 75 to about 85.

6. The laminating adhesive of claim 1 wherein the hydrocarbon is a synthetic polyolefin wax or a natural wax.

7. The laminating adhesive of claim 6, wherein the hydrocarbon is a synthetic polyethylene wax, microcrystalline wax, paraffin wax, Fischer-Tropsch wax or partially oxidized derivative thereof.

8. The laminating adhesive of claim 1 wherein about 75 to about 95 percent by weight of the adhesive consists of the blend of alkoxylated alcohol and wax.

9. The laminating adhesive of claim 1 wherein the alkoxylated alcohol is selected from those compounds represented by the formulae $$CH_3(CH_2CH_2)_xCH_2O(CH_2CH_2O)_yH \quad (IIA)$$

and $$\begin{array}{c} CH_3(CH_2CH_2)_xCH_2O(CH_2CHO)_y\text{---}H \\ | \\ CH_3 \end{array} \quad (IIB)$$

and mixtures thereof.

10. The laminating adhesive of claim 4 wherein the hydrocarbon wax is a microcrystalline wax or paraffin wax.

11. The laminating adhesive of claim 1 further comprising an oxygen-containing polymer, the alkyl portion of which has a molecular weight less than 2,000, selected from the group consisting of:

(i.) an oxyalkylated alcohol of the formula:

$$C\text{---}D \quad (III)$$

wherein C is represented by a unit of the formula $$\begin{array}{c} R \quad R_1 \\ | \quad | \\ CH_3(CHCH)_r \end{array}$$

and D is represented by a unit of the formula $$\begin{array}{c} R_2 \\ | \\ CH_2O(CH_2CHO)_sH \end{array}$$

where R and $R_1$ are independently selected from the group consisting of hydrogen and a $C_1$-$C_{10}$ alkyl group; $R_2$ is hydrogen or a $C_1$-$C_5$ alkyl group; r is greater than or equal to 1 but less than 70; and s is between about 0 to about 45; provided the weight ratio of D/C+D is between 0 and 50 percent;

(ii.) a monocarboxylic acid;

(iii.) a graft polymer wherein the grafting monomer is a cyclic anhydride and the backbone is a polyolefin wherein the weight ratio of alkoxylated alcohol to oxygen-containing polymer is greater than or equal to 1:1.

12. A repulpable laminating adhesive comprising:

(a) about 75 to about 95 percent by weight of a 5:95 to 95:5 parts by weight blend of (i) an alkoxylated alcohol of the formula $$A\text{---}B \quad (I)$$

wherein A is the unit $$\begin{array}{c} R \quad R_1 \\ | \quad | \\ CH_3(CHCH)_x\text{---} \end{array} \quad (IA)$$

and B is the unit $$\begin{array}{c} R_2 \\ | \\ CH_2O(CH_2CHO)_yH \end{array} \quad (IB)$$

and further wherein R and $R_1$ are independently selected from the group consisting of hydrogen and a $C_1$-$C_{10}$ alkyl group; $R_2$ is hydrogen or a $C_1$-$C_5$ alkyl group; x is between about 1 to about 142; and y is between 2 to about 817; provided the weight ratio of B/A+B is between 51 and 90 percent; and (ii) a linear or branched chain saturated aliphatic hydrocarbon wax;

(b) about 2 to about 15 percent by weight of an elastomer; and (c) about 1 to about 10 percent by weight of a tackifying resin.

13. The laminating adhesive of claim 12 wherein the elastomer is selected from the group consisting of copolymers of vinyl acetate and either ethylene or an ethylenically unsaturated carboxylic acid or ester, ethylene acrylic acid copolymers, ethylene vinyl acetal copolymers, polyvinyl acetal, polyethylene, polypropylene, polyamide, polyester condensation product, polyurethane, an alkyl cellulose, and an A—B—A block copolymer wherein the A block is a thermoplastic polymer and the B block is a conjugated diene.

14. The laminating adhesive of claim 13 wherein the copolymer is an ethylene vinyl acetate copolymer.

15. The laminating adhesive of claim 12 wherein the hydrocarbon wax is selected from the group consisting of natural waxes and synthetic polyolefin waxes.

16. The laminating adhesive of claim 15 wherein the hydrocarbon wax is a synthetic polyolefin wax, microcrystalline wax, paraffin wax, Fischer-Tropsch wax or a partially oxidized derivative thereof.

17. The laminating adhesive of claim 12 wherein x is between about 11 to about 70.

18. The laminating adhesive of claim 12 wherein y is between about 3 to about 408.

19. The laminating adhesive of claim 12 wherein the weight ratio of B/A+B is between about 75 to about 85.

20. The laminating adhesive of claim 12 further comprising an oxygen-containing polymer, the alkyl portion of which has a molecular weight less then 2,000, selected from the group consisting of:

(i.) an oxyalkylated alcohol of the formula:

$$C-D \qquad (III)$$

wherein C is represented by a unit of the formula $$CH_3(CHCH)_r \atop \phantom{CH_3(}R\phantom{CH)}R_1$$

and D is represented by a unit of the formula $$CH_2O(CH_2CHO)_sH \atop \phantom{CH_2O(CH_2C}R_2$$

where R and $R_1$ are independently selected from the group consisting of hydrogen and a $C_1$-$C_{10}$ alkyl group; $R_2$ is hydrogen or a $C_1$-$C_5$ alkyl group; r is greater than or equal to 1 but less than 70; and s is between about 0 to about 45; provided the weight ratio of D/C+D is between 0 and 50 percent;

(ii.) a monocarboxylic acid;

(iii.) a graft polymer wherein the grafting monomer is a cyclic anhydride and the backbone is a polyolefin wherein the weight ratio of alkoxylated alcohol to oxygen-containing polymer is greater than or equal to 1:1.

21. The laminating adhesive of claim 20 wherein the oxygen containing polymer is an alcohol of the formula (III) and further wherein r is between about 9 to about 60.

22. The laminating adhesive of claim 21 wherein r is between about 11 to about 45.

23. The laminating adhesive of claim 21 wherein s is between about 3 to about 40.

24. The laminating adhesive of claim 21 wherein the weight ratio of D/C+D is between about 0 to about 20 percent.

25. The laminating adhesive of claim 12 wherein the alkoxylated alcohol is selected from those compounds represented by the formulae $$CH_3(CH_2CH_2)_xCH_2O(CH_2CH_2O)_yH \qquad (IIA)$$

and $$CH_3(CH_2CH_2)_xCH_2O(CH_2CHO)_y-H \atop \phantom{CH_3(CH_2CH_2)_xCH_2O(CH_2CHO)_y-}CH_3 \qquad (IIB)$$

and mixtures thereof.

26. The laminating adhesive of claim 25 wherein the hydrocarbon wax is a microcrystalline wax or a paraffin wax.

27. The laminating adhesive of claim 20 wherein the elastomer is selected from the group consisting of ethylene vinyl acetate copolymers, ethylene acrylic acid copolymers, polyethylene, polypropylene, and an A—B—A block copolymer wherein the A block is a thermoplastic polymer and the B block is a conjugated diene.

28. In a laminating adhesive composition comprising a synthetic elastomer, tackifier, and wax the improvement comprising the addition of an alkoxylated alcohol of the formula $$A-B \qquad (I)$$

wherein A is the unit $$CH_3(CHCH)_{\overline{x}} \atop \phantom{CH_3(}R\phantom{CH)}R_1 \qquad (IA)$$

and B is the unit $$CH_2O(CH_2CHO)_yH \atop \phantom{CH_2O(CH_2C}R_2 \qquad (IB)$$

wherein R and $R_1$ are independently selected from the group consisting of hydrogen and a $C_1$-$C_{10}$ alkyl group; $R_2$ is hydrogen or a $C_1$-$C_5$ alkyl group; x is between about 1 to about 142; and y is between 2 to about 817; provided the weight ratio of B/A+B is between 51 and 90 percent
wherein the weight ratio of alkoxylated alcohol to wax is between 5:95 to 95:5.

29. The laminating adhesive composition of claim 28, wherein the alkoxylated alcohol is of the formulae $$CH_3(CH_2CH_2)_xCH_2O(CH_2CH_2O)_yH \qquad (IIA)$$

and $$CH_3(CH_2CH_2)_xCH_2O(CH_2CHO)_y-H \atop \phantom{CH_3(CH_2CH_2)_xCH_2O(CH_2CHO)_y-}CH_3 \qquad (IIB)$$

and mixtures thereof.

30. A blend comprising 5:95 to 95:5 parts by weight of an (i) alkoxylated alcohol of the formula $$A-B \qquad (I)$$

wherein A is the unit $$CH_3(CHCH)_{\overline{x}} \atop \phantom{CH_3(}R\phantom{CH)}R_1 \qquad (IA)$$

and B is the unit $$CH_2O(CH_2CHO)_yH \atop \phantom{CH_2O(CH_2C}R_2 \qquad (IB)$$

and further wherein R and $R_1$ are independently selected from the group consisting of hydrogen and a $C_1$-$C_{10}$ alkyl group; $R_2$ is hydrogen or a $C_1$-$C_5$ alkyl group; x is between about 1 to about 142; and y is between 2 to about 817; provided that the weight percentage of B/A+B is between 51 and 90 percent; and (ii) a linear or branched chain saturated aliphatic hydrocarbon wax having a molecular weight of from about 300 to about 5,000 which when used in combination with a tackifier and elastomer renders a laminating adhesive of high viscosity and tackiness.

* * * * *